United States Patent
Sogawa et al.

(10) Patent No.: US 8,199,623 B2
(45) Date of Patent: Jun. 12, 2012

(54) OPTICAL PICKUP

(75) Inventors: Teruaki Sogawa, Osaka (JP); Masanori Takahashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 444 days.

(21) Appl. No.: 12/256,497

(22) Filed: Oct. 23, 2008

(65) Prior Publication Data

US 2009/0122687 A1 May 14, 2009

(30) Foreign Application Priority Data

Nov. 12, 2007 (JP) ................................. 2007-292941

(51) Int. Cl.
*G11B 7/00* (2006.01)

(52) U.S. Cl. .................................................. 369/53.27

(58) Field of Classification Search .................. None
See application file for complete search history.

(56) References Cited

U.S. PATENT DOCUMENTS

| | | | |
|---|---|---|---|
| 6,950,378 B1 * | 9/2005 | Miyazaki et al. | 369/47.52 |
| 2003/0081520 A1 * | 5/2003 | Hibino | 369/53.19 |
| 2003/0202453 A1 * | 10/2003 | Cho et al. | 369/112.24 |
| 2005/0111516 A1 | 5/2005 | Hatano et al. | |
| 2006/0158992 A1 * | 7/2006 | Sakai | 369/112.01 |

FOREIGN PATENT DOCUMENTS

| | | |
|---|---|---|
| JP | 2003-317296 A | 11/2003 |
| JP | 2004-178699 A | 6/2004 |
| JP | 2006-147014 A | 6/2006 |

* cited by examiner

*Primary Examiner* — Peter Vincent Agustin
*Assistant Examiner* — Emily Frank
(74) *Attorney, Agent, or Firm* — Global IP Counselors

(57) ABSTRACT

An optical pickup includes a semiconductor laser, a beam splitter, a collimating lens, an objective lens, an aperture and a front monitor. The beam splitter splits a light beam emitted by the semiconductor laser into transmitted light and reflected light. The front monitor detects luminous energy of the transmitted light. The front monitor is disposed near an optical axis of the transmitted light so that the following is satisfied: $1 \leq (S \times L)/(s \times f) \leq 6.8$. S is an area of an entrance pupil of the objective lens, f is an optical distance from an emission portion of the semiconductor laser to the collimating lens, s is an effective receiving area of the front monitor, and L is an optical distance from the emission portion of the semiconductor laser to the front monitor.

16 Claims, 9 Drawing Sheets

OBJECTIVE EMISSION POWER FLUCTUATION

OPTICAL PICKUP

CROSS-REFERENCE TO RELATED APPLICATIONS

This application claims priority to Japanese Patent Application No. 2007-292941 filed on Nov. 12, 2007. The entire disclosure of Japanese Patent Application No. 2007-292941 is hereby incorporated herein by reference.

BACKGROUND OF THE INVENTION

1. Field of the Invention

The present invention generally relates to an optical pickup. More specifically, the present invention relates to an optical pickup having a front monitor that detects luminous energy of a light beam directed at an optical recording medium.

2. Background Information

An optical disk device is an information recording and reproduction device. The optical disk device records and reproduces to and from low-cost media with high-speed access, large capacity, and non-contact operation. The optical disk device has been used as recording and reproduction devices for digital video and audio, and as external memory devices for computers. There are many different kinds of optical disk, with varying information recording capacities or wavelength compatibilities. For example, the recording capacity is about 650 MB when a laser beam in the 780 nm band is used on a 12-cm optical disk such as a CD-ROM or a CD-R. The recording capacity is about 4.7 GB when a laser beam in the 650 nm band is used on a DVD-ROM, a DVD-R, or the like.

CD-R and DVD-R disks have a large recording capacity and are inexpensive media, which is why their popularity has soared in recent years. When recording to a CD-R or DVD-R disk, the recording has to be carried out under the optimal recording power condition for a particular optical disk. Accordingly, an optical pickup installed in an optical disk device that records information to the optical disks includes a front monitor to perform recording at the optimal recording power. The front monitor accurately monitors emission luminous energy of an objective lens by receiving part of a light beam in front of a semiconductor laser.

Specifically, the luminous energy of the light beam emitted by the semiconductor laser is monitored, and the luminous energy of the light beam is kept at a constant value. With a front monitor system, part of the light beam is separated and the luminous energy is monitored. A beam splitter is disposed along an optical path of the light beam, and this allows part of the light beam to be separated at a constant ratio.

Furthermore, with the front monitor system, the luminous energy of the separated light beam (hereinafter referred to as monitor light) is detected by a light receiving element. Thus, with the front monitor system, the luminous energy of the received monitor light is controlled to be a specific value. As a result, the recording and reproduction luminous energy emitted from the objective lens is accurately controlled to a specified luminous energy. This is called a front monitor type of auto power control (hereinafter referred to as APC).

Recording speed need to be raised to reduce recording time for the CD-R and DVD-R disks with high-capacity. To raise the recording speed, it is necessary to rotate the optical disk at a higher speed and, at the same time, take less time to converge the light beam and form recording pits necessary to record on the optical disk, which means that emission power of the semiconductor laser used for recording has to be boosted. Consequently, an output of the semiconductor lasers installed in optical pickups has been increased every year.

A property of high-output semiconductor lasers is that an intensity distribution of the laser varies when laser emission power is changed. If the intensity distribution of the laser varies, then the intensity distribution of the light beam incident on the objective lens will vary. As a result, the power of the light beam emitted from the objective lens and converged on the optical disk will also vary. Similarly, with the front monitor, if the intensity distribution of the laser varies, then the intensity distribution of the light beam incident on the front monitor will also vary. As a result, the luminous energy detected by the front monitor varies. Accordingly, if the emission power of the laser varies, then the ratio of the luminous energy emitted by the objective lens to the luminous energy detected by the front monitor will vary. As a result, an error in the luminous energy emitted from the objective lens as estimated from the luminous energy detected by the front monitor occurs. The error in the luminous energy emitted from the objective lens adversely affects recording performance because the recording operation cannot be carried out at the optimal power level for the optical disk.

Also, when the emission power of the laser is changed, there is a tendency for a diffusion angle of the light beam to spread out if the emission power is raised. Japanese Laid-Open Patent Application Publication No. 2003-317296 discusses a technique for keeping luminous energy of a light beam constant with respect to changes in an intensity distribution of the light beam caused by spreading of a diffusion angle that accompanies a change in emission power.

The Japanese Laid-Open Patent Application Publication No. 2003-317296 shows a positional relationship between a front monitor and an optical axis of a light beam. Furthermore, the Japanese Laid-Open Patent Application Publication No. 2003-317296 shows a layout of the front monitor that receives the light beam emitted from a semiconductor laser, and a spread angle of the light beam. A light detection face of the front monitor is generally disposed in a center with respect to the optical axis of the light beam. A surface area of a light receiver of the light detection face is limited by frequency characteristics of the optical pickup. Not all of the light beam emitted from the semiconductor laser can be received, but part of the light beam is always received.

The center of the light detection face of the front monitor is disposed at a location a certain distance away from the optical axis of the light beam emitted from the semiconductor laser. Therefore, with the light detection face of the front monitor, the light beam is detected at a point where the amount of change in the light beam intensity is large, such as a point near the midsection of the intensity distribution of the light beam emitted from the semiconductor laser. The effect of thus disposing the light detection face of the front monitor is that the light beam intensity resulting from a change in the spread angle can be detected at the light detection face with a limited light receiving surface area. Furthermore, the luminous energy of the light beam can be kept constant so that the ratio of the luminous energy detected by the front monitor to the luminous energy emitted by the objective lens is substantially constant.

With the technique discussed in Japanese Laid-Open Patent Application Publication No. 2003-317296, it is possible to keep the luminous energy of the light beam constant so that the ratio of the luminous energy detected by the front monitor to the luminous energy emitted by the objective lens is substantially constant with respect to changes to the spread angle related to the emission power of the semiconductor laser. However, no thought is given for offsetting of an optical axis angle of the light beam caused by changes in temperature of the semiconductor laser. Thus, the luminous energy of the light beam cannot be kept constant with respect to offset to the optical axis angle. As a result, the APC does not operate properly.

In view of the above, it will be apparent to those skilled in the art from this disclosure that there exists a need for an improved optical pickup. This invention addresses this need in the art as well as other needs, which will become apparent to those skilled in the art from this disclosure.

SUMMARY OF THE INVENTION

The present invention is conceived in light of the above-mentioned problems. One object of the present invention is to provide an optical pickup with which luminous energy of a light beam is accurately detected.

In accordance with one aspect of the present invention, an optical pickup includes a semiconductor laser, a beam splitter, a collimating lens, an objective lens, an aperture and a front monitor. The semiconductor laser is configured to emit a light beam. The beam splitter is arranged relative to the semiconductor laser to split the light beam emitted by the semiconductor laser into transmitted light and reflected light. The collimating lens is arranged to parallelize the reflected light from the beam splitter. The objective lens is arranged to converge the reflected light being parallelized by the collimating lens on an optical disk. The aperture is arranged to limit the reflected light incident on the objective lens. The front monitor is arranged to receive the transmitted light and detect luminous energy of the transmitted light to detect luminous energy of the reflected light emitted from the objective lens. The front monitor is disposed near an optical axis of the transmitted light so that a ratio of the luminous energy detected by the front monitor to the luminous energy emitted by the objective lens maintains a substantially constant value and the following is satisfied: $1 \leq (S \times L)/(s \times f) \leq 6.8$. S is an area of an entrance pupil of the objective lens, f is an optical distance from an emission portion of the semiconductor laser to the collimating lens, s is an effective receiving area of the front monitor, and L is an optical distance from the emission portion of the semiconductor laser to the front monitor.

With the optical pickup of the present invention, it is possible to provide an optical pickup with which luminous energy of a light beam is accurately detected.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
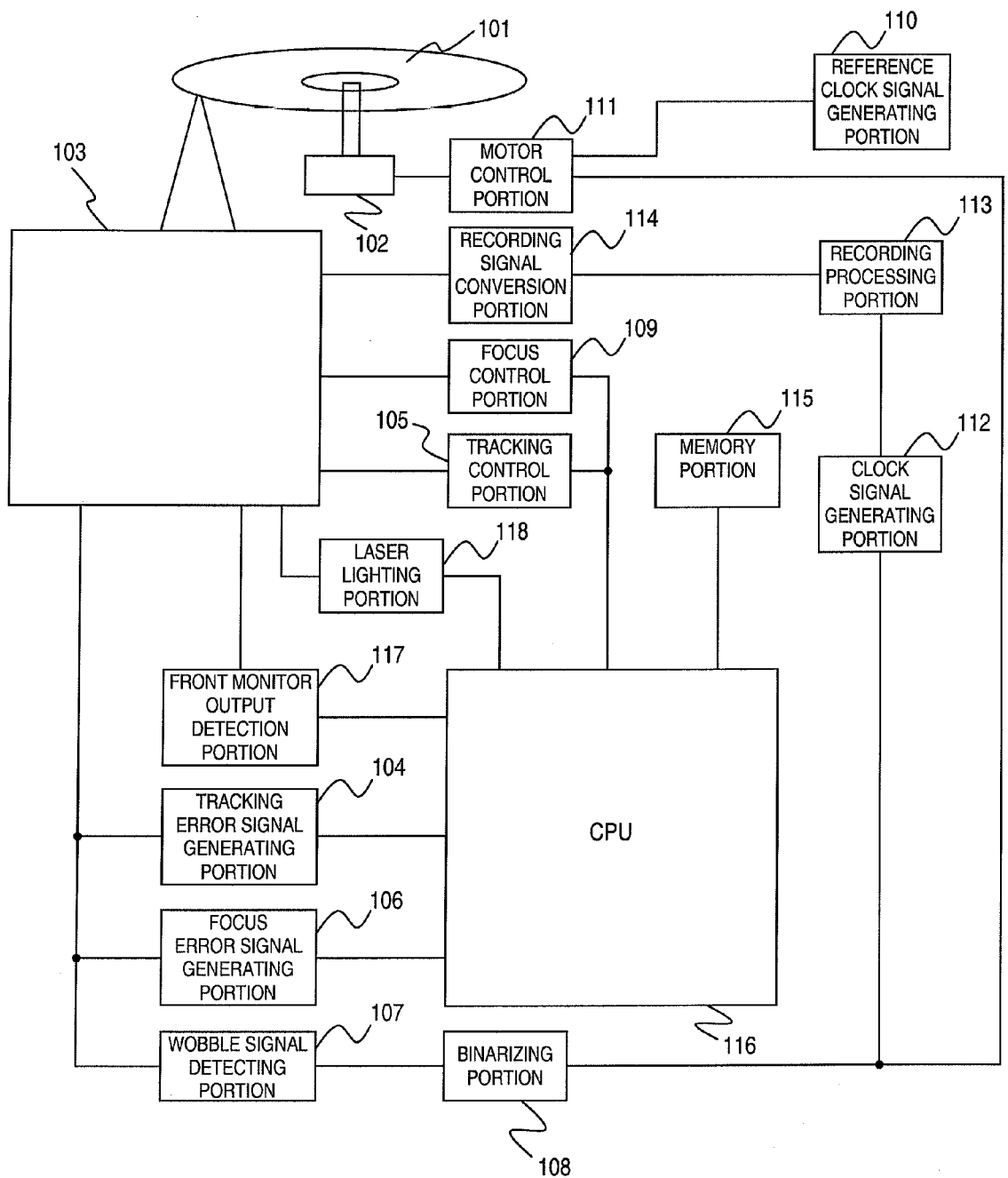
FIG. 1 is a block diagram of an optical disk device having an optical pickup in accordance with a first embodiment of the present invention.

FIG. 1 is a block diagram of an optical disk device. The optical disk device includes a spindle motor 102, an optical pickup 103, a tracking error signal generating portion 104, a tracking control portion 105, a focus error signal generating portion 106, a wobble signal detecting portion 107, a binarizing portion 108, a focus control portion 109, a reference clock signal generating portion 110, a motor control portion 111, a clock signal generating portion 112, a recording processing portion 113, a recording signal conversion portion 114, a memory portion 115, a CPU 116, a front monitor output detection portion 117 and a laser lighting portion 118.

The spindle motor 102 rotates an optical disk 101. The optical pickup 103 outputs a laser beam. The tracking error signal generating portion 104 generates a tracking error signal (hereinafter referred to as a TE signal) through detection by a push-pull method or the like. In the push-pull method, positional offset between a light beam spot and a track (or a groove) is corrected in an inner or an outer peripheral direction based on a change in an amount of information light using as a reference an amount of information light when there is no positional offset. The tracking control portion 105 controls a position of a spot of the light beam so that the light beam will follow the track according to the TE signal outputted from the tracking error signal generating portion 104. The focus error signal generating portion 106 detects the positional offset of the disk and the spot of the light beam. The wobble signal detecting portion 107 detects a wobble signal from an output signal of the optical pickup 103. The binarizing portion 108 binarizes the wobble signal. The focus control portion 109 corrects focus blur based on the output of the focus error signal generating portion 106. The reference clock signal generating portion 110 generates clock signal for controlling rotation of the spindle motor 102. The motor control portion 111 controls the rotation of the spindle motor 102 along with the output of the reference clock signal generating portion 110 and the frequency of the wobble signal outputted from the binarizing portion 108. The clock signal generating portion 112 generates a recording bit clock signal from the binarized wobble signal. The recording processing portion 113 converts video data, audio data, or other such recording data to a specific format based on the bit clock signal outputted from the clock signal generating portion 112. The recording signal conversion portion 114 converts a format conversion signal outputted from the recording processing portion 113 to a specific recording waveform. The memory portion 115 stores parameters related to the various controls. The CPU 116 controls each of the portions of the optical disk device. The front monitor output detection portion 117 detects intensity of the laser beam emitted by the optical pickup 103. The laser lighting portion 118 lights a semiconductor laser 201 provided to the optical pickup 103 and adjusts the intensity of the laser beam according to the amount of received light detected by the front monitor output detection portion 117.

The optical pickup 103 is moved in the inner and outer peripheral direction of the optical disk 101 based on the output signal of the tracking control portion 105. The optical pickup 103 is also moved upward and downward based on the output signal of the focus control portion 109. The optical pickup 103 records video data, audio data, or other such recording data to the optical disk 101 according to the recording waveform signal outputted from the recording signal conversion portion 114.

Figure 2:
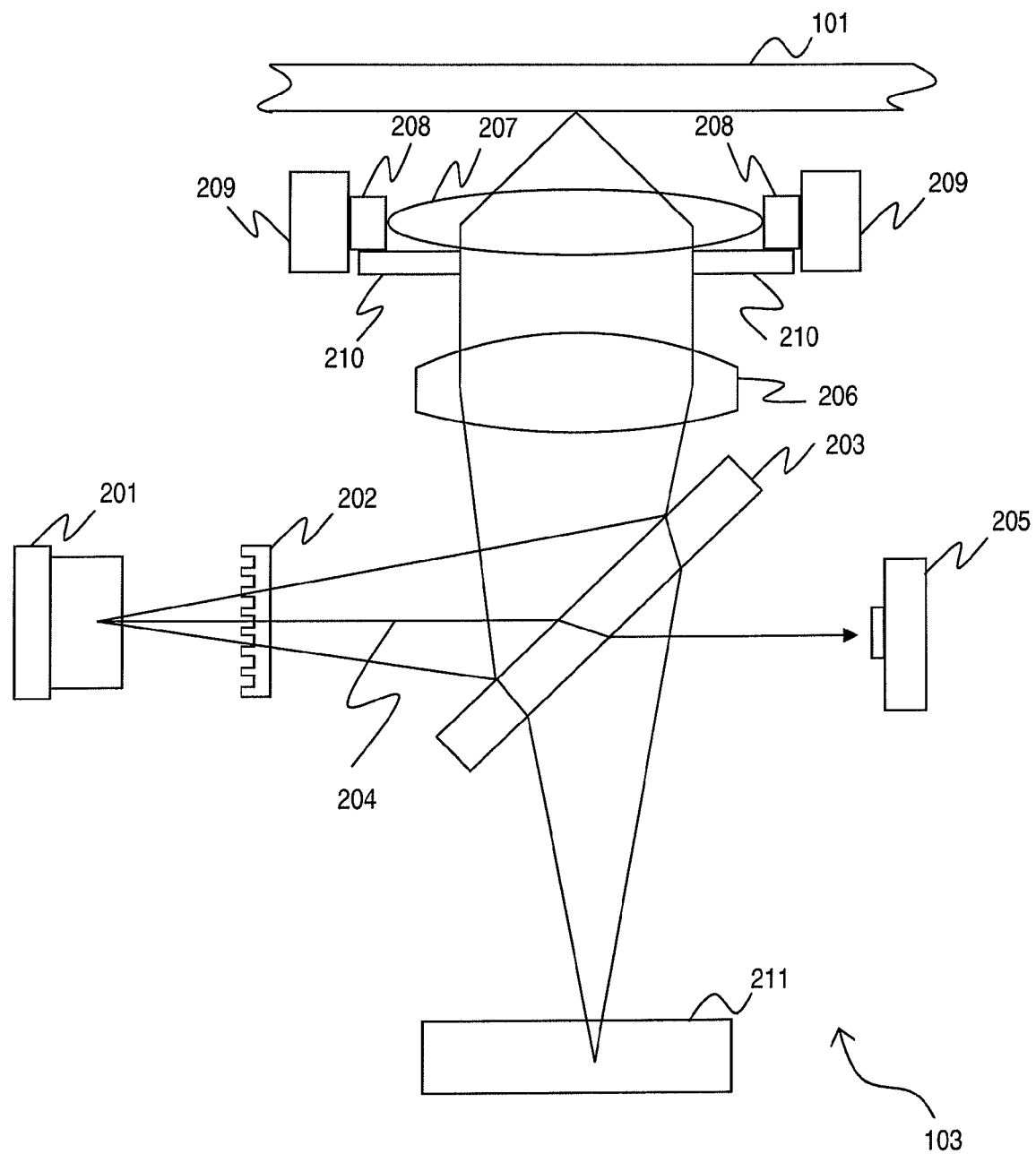
FIG. 2 is a schematic side view of the optical pickup illustrated in FIG. 1.

FIG. 2 shows a schematic side view of the optical pickup 103. The optical pickup 103 includes a semiconductor laser 201, a diffraction grating 202, a beam splitter 203, a front monitor 205, a collimating lens 206, an objective lens 207, an actuator 208, a drive coil 209, an aperture 210 and a light detector 211. The semiconductor laser 201 oscillates at a wavelength of 780 nm or in the 650 nm band. The semiconductor laser 201 is shown in a lit state. The light beam emitted from the semiconductor laser 201 is transmitted through the diffraction grating 202 and reaches the beam splitter 203. Here, the light beam transmitted by the diffraction grating 202 includes at least three light beams of 0-order light that is transmitted unchanged by a diffraction groove formed on the diffraction grating 202, and ±1-order diffracted lights that proceed after separating from the 0-order light at a specific diffraction angle. The beam splitter 203 includes a half mirror. The beam splitter 203 is disposed at a 45° angle to an optical axis 204 of the light beam. The beam splitter 203 is an optical element having a reflective film formed on a surface that reflects approximately 80% of the laser beam with a wavelength in the 650 nm band and simultaneously transmits approximately 20%. Therefore, approximately 20% of the light beam (e.g., transmitted light) passes through the beam splitter 203 and reaches the front monitor 205. The front monitor 205 receives the light beam that passes through the beam splitter 203 and detects the luminous energy of the light beam to detect luminous energy of the light beam emitted from the objective lens 207. The remaining approximately 80% of the light beam (e.g., reflected light) is reflected by the reflective film of the beam splitter 203. Then, the reflected light is converted by the collimating lens 206 into a parallel light beam, and reaches the objective lens 207. Here, the objective lens 207 is supported integrally with the actuator 208. When power is sent to the drive coil 209, the light beam transmitted by the objective lens 207 is focused on an information recording face of the optical disk 101, and three light spots of 0-order light and ±1-order diffracted lights can be formed. Also, the aperture 210 is provided to limit luminous energy of the laser beam emitted from the collimating lens 206 and prevent scattered reflection in an interior of the optical pickup 103 by stray light. Specifically, the aperture 210 limits flux of the light beam incident on the objective lens 207.

The luminous energy of the light beam transmitted by the objective lens 207, or the luminous energy of the light spot converged on the optical disk 101 can be estimated based on the luminous energy detected by the front monitor 205. The light beam reflected by the optical disk 101 goes back along the same optical path on which it came. Specifically, the light beam reflected by the optical disk 101 goes through the objective lens 207 and the collimating lens 206, and reaches the beam splitter 203, where approximately 20% of the return luminous energy of the light beam is transmitted. The light beam transmitted through the beam splitter 203 has already been made into coherent light by the collimating lens 206. Thus, astigmatism is imparted to the light beam as the light beam passes through the beam splitter 203, which is inclined at 45° to a direction in which the light beam is moving. After this, the light beam is converged at a specific location of the light detector 211.

Figure 3:
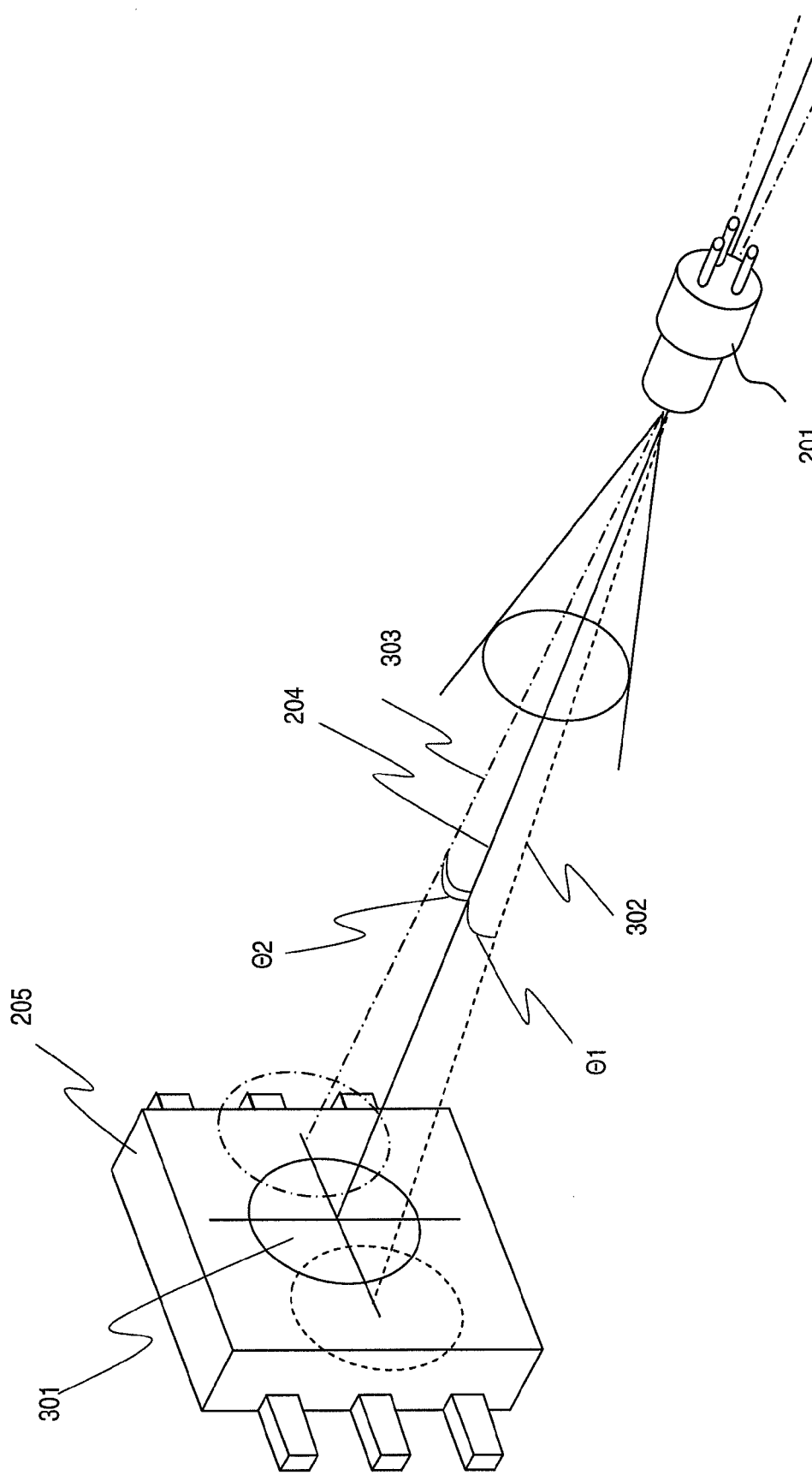
FIG. 3 is a detail view of the optical pickup illustrated in FIG. 1 showing a positional relationship between a front monitor and a center axis of a light beam.

FIG. 3 shows the positional relationship between the front monitor 205 and the center optical axis 204 of the light beam emitted from the semiconductor laser 201. The front monitor 205 is disposed so that the optical axis 204 is incident on a center of a light detection face 301 of the front monitor 205. When power is supplied to the semiconductor laser 201 to light the semiconductor laser 201, this power consumption raises the temperature of the semiconductor laser 201. As a result, a change in an emission angle of the light beam occurs, which produces an offset angle $\theta 1$ or $\theta 2$ in the optical axis 204 of the light beam. The offset angle $\theta 1$ or $\theta 2$ will occur leftward, rightward, upward or downward from the center of the light detection face 301 of the front monitor 205, depending on the characteristics of an individual semiconductor laser 201. In FIG. 3, the offset angle $\theta 1$ is an angle between a solid line connecting the center of the light detection face 301 of the front monitor 205 with an emission point (e.g., emission portion) of the semiconductor laser 201 (offset angle $\theta$=zero), and a broken line 302, which is the optical axis of the light beam generated at an offset angle to the left and toward the light detection face 301 by the rise in temperature of the semiconductor laser 201. The offset angle $\theta 2$ is an angle between the solid line connecting the center of the light detection face 301 of the front monitor 205 with the emission point of the semiconductor laser 201, and a one-dot chain line 303, which is the optical axis of the light beam generated at an offset angle to the right and toward the light detection face 301 by the rise in temperature of the semiconductor laser 201.

Figure 4:
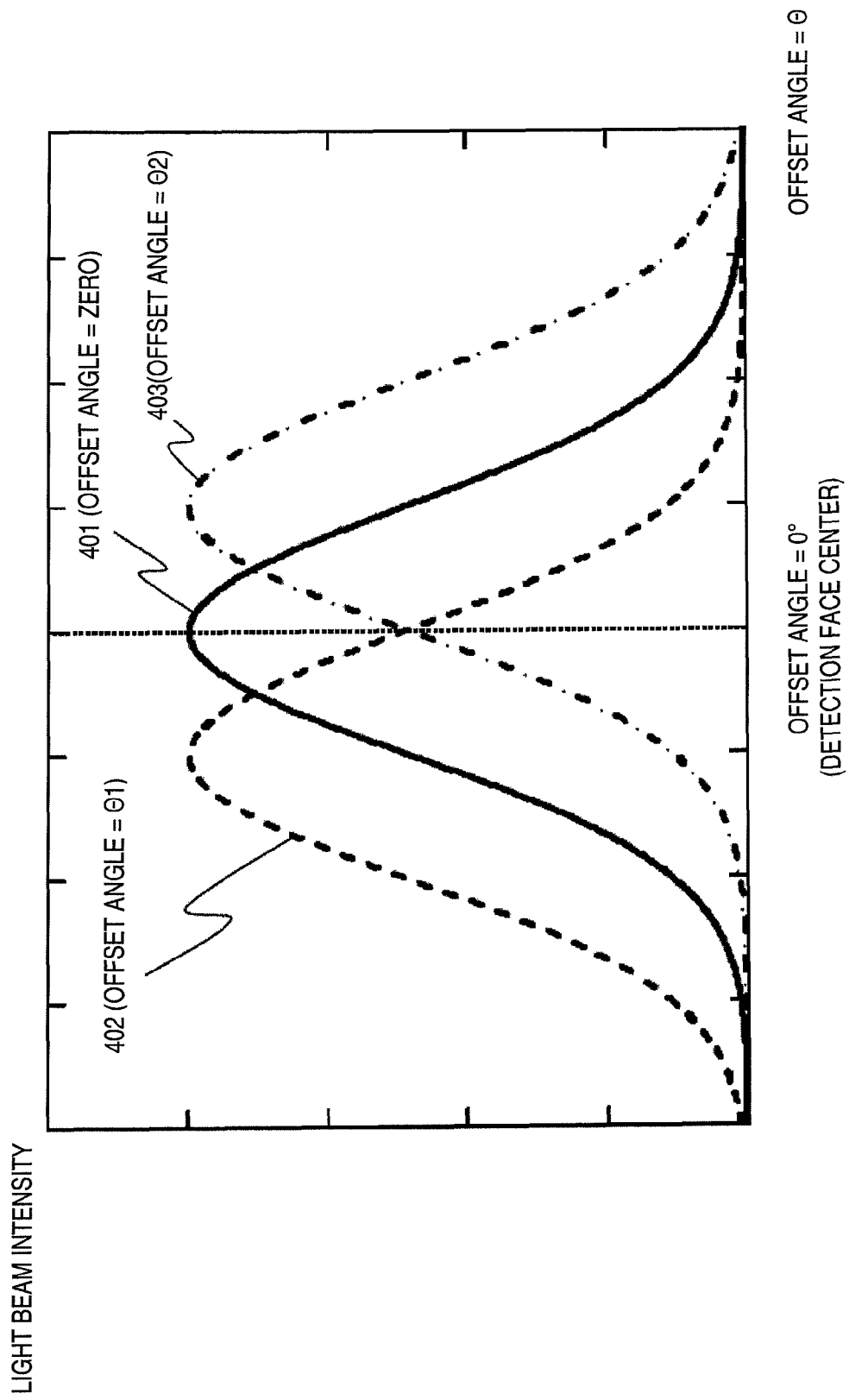
FIG. 4 is a graph showing intensity distribution of the light beam detected by the front monitor.

FIG. 4 is a graph of an intensity distribution of the light beam detected by the front monitor 205. When the optical axis 204 of the light beam is coincide to the solid line connecting the center of the light detection face 301 with the emission point of the semiconductor laser 201, the intensity of the light beam detected by the front monitor 205 is as indicated by the solid line 401. Specifically, the intensity of the light beam reach a maximum value when the offset angle $\theta$ expressed by the horizontal axis is zero, and decreases as $\theta$ moves away from zero. Meanwhile, with a light beam in which the offset angle $\theta 1$ has been generated by the rise in temperature, as indicated by the broken line 402, the intensity of the light beam exhibits the same waveform as the intensity of the light beam indicated by the solid line. However, the maximum value of the intensity of the light beam is offset to the left from the center (offset angle=zero). Also, with a light beam in which the offset angle $\theta 2$ has been generated, as indicated by the one-dot chain line 403, the intensity of the light beam exhibits the same waveform as the intensity of the light beam indicated by the solid line. However, the maximum value of the intensity of the light beam is offset to the right from the center (offset angle=zero).

Thus, when the rise in the temperature of the semiconductor laser 201 produces offset in the optical axis of the light beam, this changes amount of received light detected by the front monitor 205. When the optical axis is offset from the center of the light detection face 301, the amount of light received at the light detector 211 is reduced even though there is no change in the intensity of the light beam emitted from the semiconductor laser 201. Then, the laser lighting portion 118 operates so as to increase the emission power. As a result, an excessively powerful light beam is emitted from the objective lens 207 without APC (Auto Power Control) operating properly. Thus, there is the possibility that there will be loss in the recording to the optical disk 101.

Figure 5:
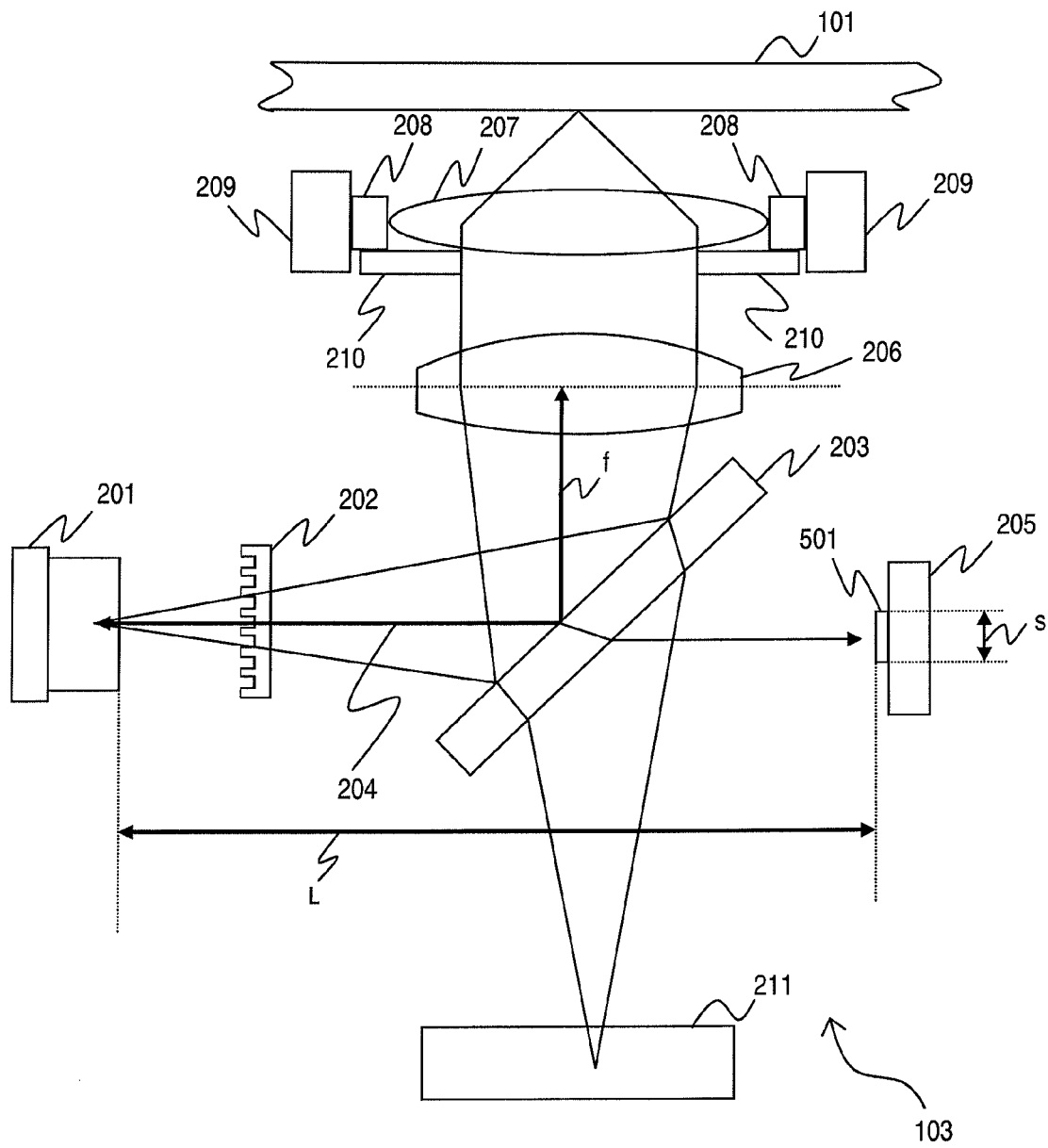
FIG. 5 is a schematic side view of the optical pickup illustrated in FIG. 1.
Figure 6:
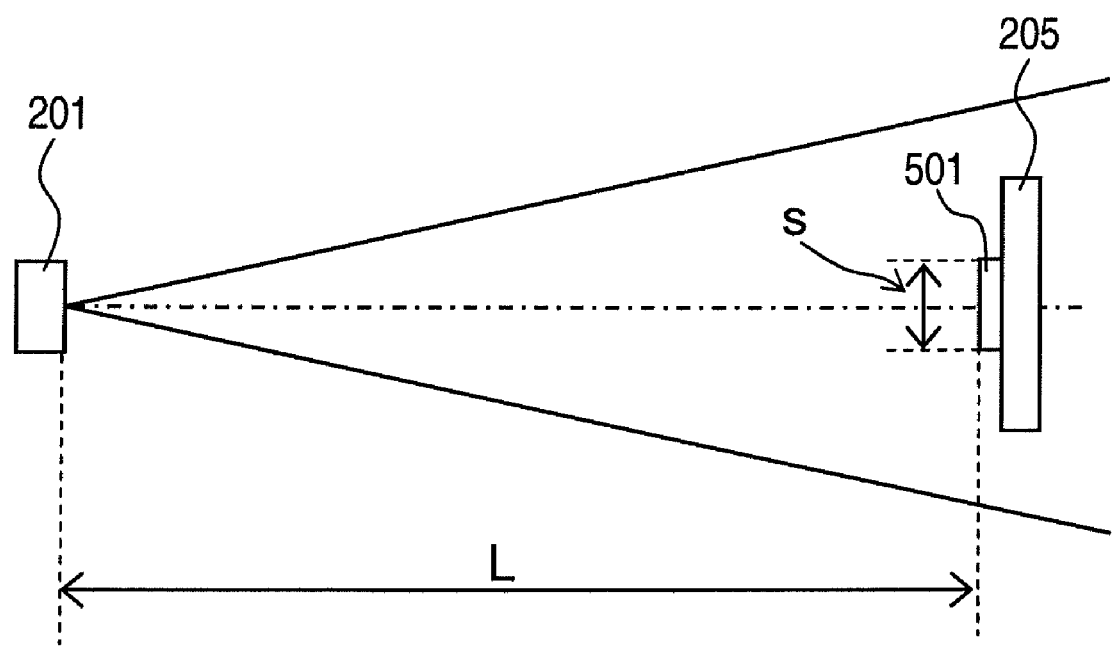
FIG. 6 is a detail view of the optical pickup illustrated in FIG. 1 showing a positional relationship between the front monitor and the light beam.

FIG. 5 is a schematic side view of the optical pickup 103. FIG. 6 is a detail view showing a positional relationship between the front monitor 205 and the light beam (e.g., transmitted light). As shown in FIGS. 5 and 6, the front monitor 205 is disposed near an optical axis of the transmitted light so that a ratio of the luminous energy detected by the front monitor 205 to the luminous energy emitted by the objective lens 207 maintains a substantially constant value. Furthermore, the front monitor 205 is disposed so that the following is satisfied: $1 \leq (S \times L)/(s \times f) \leq 6.8$. Here, S is an area of an entrance pupil of the objective lens 207, f is an optical distance of an optical path from the emission point of the semiconductor laser 201 to the collimating lens 206, s is an effective receiving area of the front monitor 205, and L is an optical distance from the emission point of the semiconductor laser 201 to the front monitor 205. More specifically, s is a surface area of a light receiver 501 of the front monitor 205, S is equal to an opening area of the aperture 210, L is an optical distance from the emission point of the semiconductor laser 201 to the light receiver 501 of the front monitor 205, and f is an optical distance from the emission point of the semiconductor laser 201 to a main plain of the collimating lens 206. In particular, the aperture 210 limits the reflected light parallelized by the collimating lens 206. Thus, almost all of the reflected light limited by the aperture 210 is incident on the objective lens 207 as a spot light having the same area as the opening area of the aperture 210. The light receiver 501 of the front monitor 205 is designed so that a light receiving surface area of the light receiver 501 is sufficiently large with respect to a diameter of the light beam being received, which allows the light beam to be received properly even when the diameter of the light beam changes. However, if the light receiving surface area is too large, the electrostatic capacity will also be larger, so the frequency characteristics of the photodetection results will suffer correspondingly, which may deteriorate the APC frequency characteristics. Furthermore, the light beam reflected at the light receiving face (e.g., incidence face) of the light receiver 501 becomes stray light, which is incident on the light receiving system that receives the reflected light from the optical disk 101. As a result, the SN ratio of the reproduction signal is adversely affected. Also, making the light receiver 501 larger can hamper efforts to make the optical pickup 103 more compact.

For these reasons, it is impractical to increase the surface area s of the light receiver 501 of the front monitor 205. Thus, the surface area s of the light receiver 501 is limited. Therefore, the light receiver 501 is designed small, but the light receiver 501 is disposed closer to the light beam for the light beam to be properly received by the small light receiver 501. Also, the closer the light receiver 501 is disposed to the emission point of the semiconductor laser 201, the more possible it will be to keep up with changes to the optical axis of the light beam caused by the rise in temperature. Therefore, the front monitor 205 is disposed so that the following relationship is true:

$$1 < (S \times L)/(s \times f) \leq 6.8.$$

Figure 7:
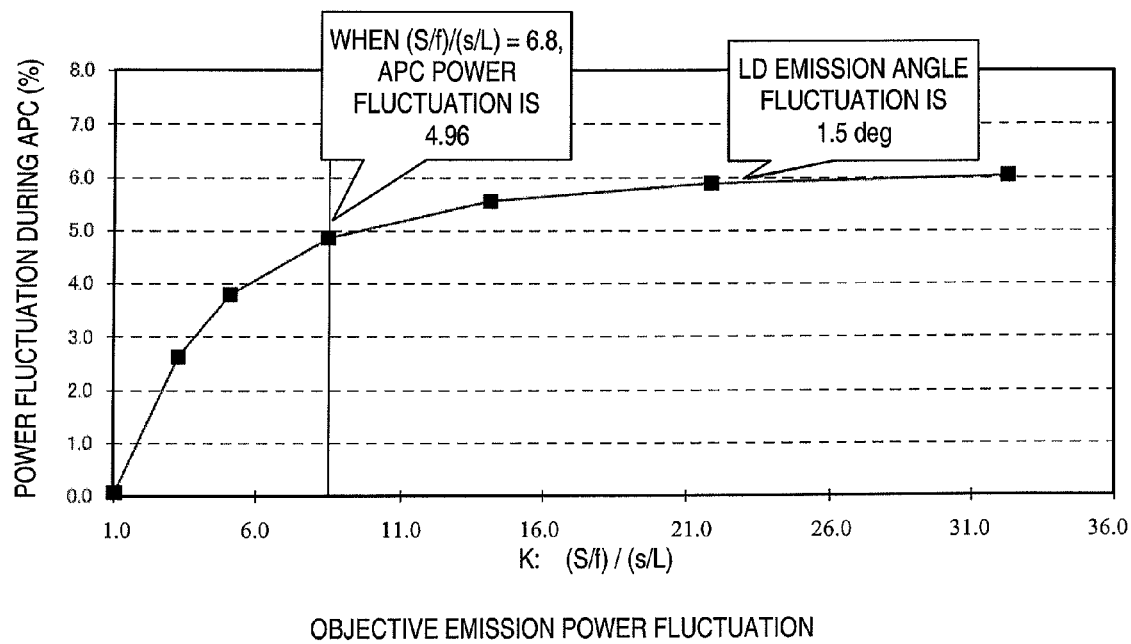
FIG. 7 is a graph showing a relationship between a value of $(S \times L)/(f \times s)$ and a proportional power fluctuation of APC.

FIG. 7 shows a relationship between a value of $(S \times L)/(s \times f)$ and a proportional power fluctuation of the APC. When the APC power fluctuation is zero percent, the APC performs complete control and a ratio of the luminous energy emitted by the objective lens 207 to the luminous energy received by the front monitor 205 is held steady. On the other hand, as the percentage of fluctuation rises, the APC control is unstable. In this embodiment, the optical distance L from the emission point of the semiconductor laser 201 to the light receiver 501 of the front monitor 205 is set based on the relationship described above. As shown in FIG. 7, $(S \times L)/(s \times f)$ reaches 6.8 when the APC power fluctuation nears 5.0%. By thus setting the value of $(S \times L)/(s \times f)$ to be at least 1 and less than 6.8, the APC power fluctuation can be kept within 5.0% or less. As a result, recording to the optical disk 101 can be performed at the optimal light beam intensity.

With the optical pickup 103, the distance L from the emission point of the semiconductor laser 201 to the light receiver 501 of the front monitor 205 is adjusted and the front monitor 205 is disposed so that the above relationship is true. Thus, it is possible to have design latitude related to the layout of the front monitor 205 so that even if the rise in temperature causes the optical axis to have an offset angle, the change in the amount of received light can be reliably detected and the optical axis offset of the light beam caused by a change in emission power can be kept up with as much as possible.

With the optical pickup 103, the distance L is adjusted and the front monitor 205 is disposed so that the following is satisfied: $1 \leq (S \times L)/(s \times f) \leq 6.8$. Thus, even if a change in the emission power of the semiconductor laser 201 change the optical axis of the light beam, the change in the luminous energy detected by the front monitor 205 can be accurately ascertained, the semiconductor laser 201 can be controlled to the optimal power for recording to the optical disk 101, and the luminous energy emitted from the objective lens 207 can be controlled. Also, by satisfying the above relationship, changes in the optical axis can be tracked optimally, and design latitude related to the layout of the front monitor 205 can be afforded. Also, if the above relationship is satisfied while the front monitor 205 is disposed along the optical axis of the light beam transmitted through the beam splitter 203, it will be possible to limit the difference between the luminous energy per unit of surface area of the light beam emitted by the objective lens 207 and the luminous energy per unit of surface area received by the light receiver 501 of the front monitor 205. Thus, even if the optical axis of the light beam is offset by a change in the emission power of the semiconductor laser 201, the change in the amount of light beam received by the front monitor 205 can be tracked and the semiconductor laser 201 correspondingly controlled to the optimal power for recording to the optical disk 101, and the luminous energy incident on or emitted from the objective lens 207 can be controlled to a constant value.

Second Embodiment

Figure 8:
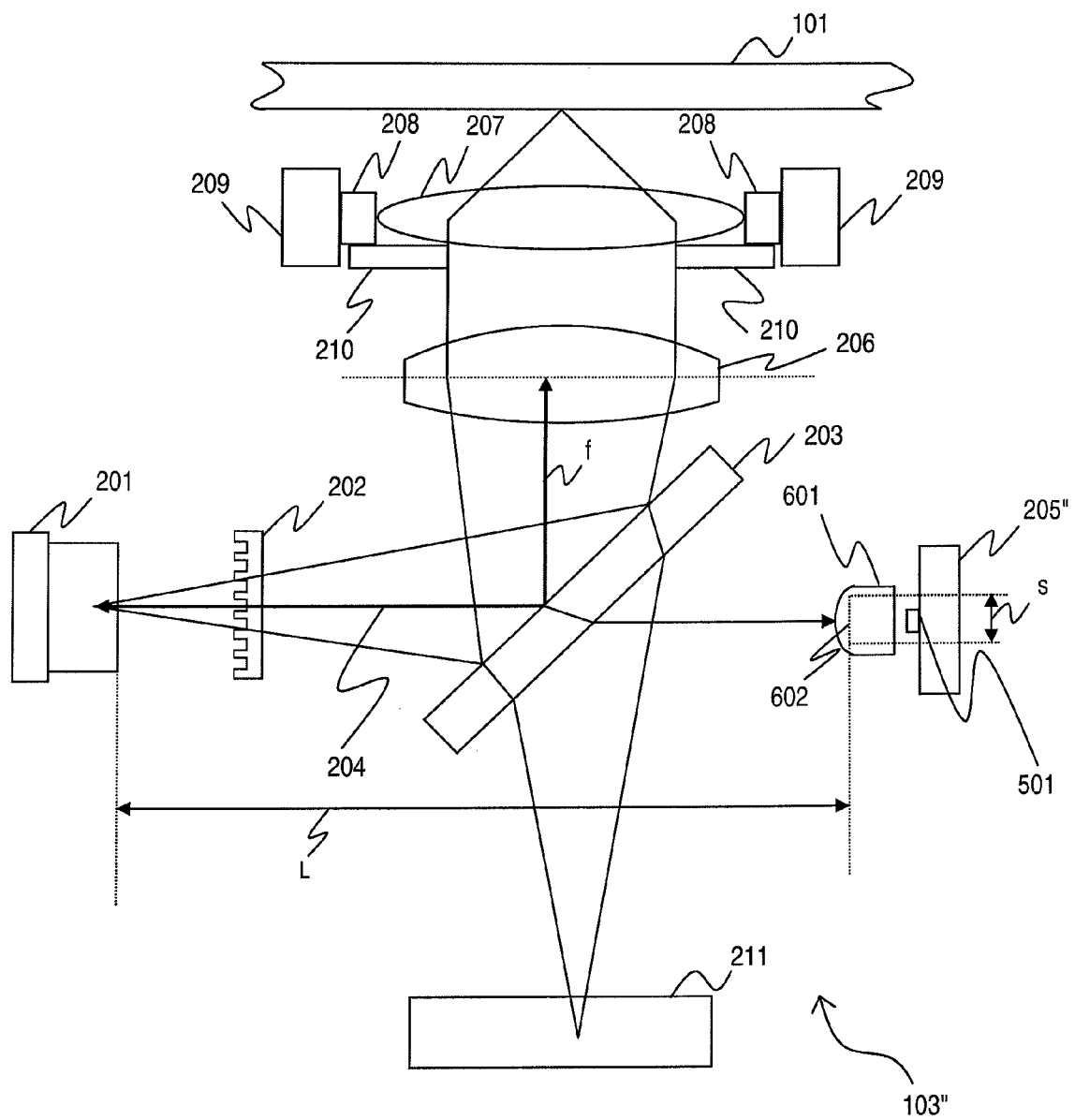
FIG. 8 is a schematic side view of an optical pickup in accordance with a second embodiment of the present invention.
Figure 9:
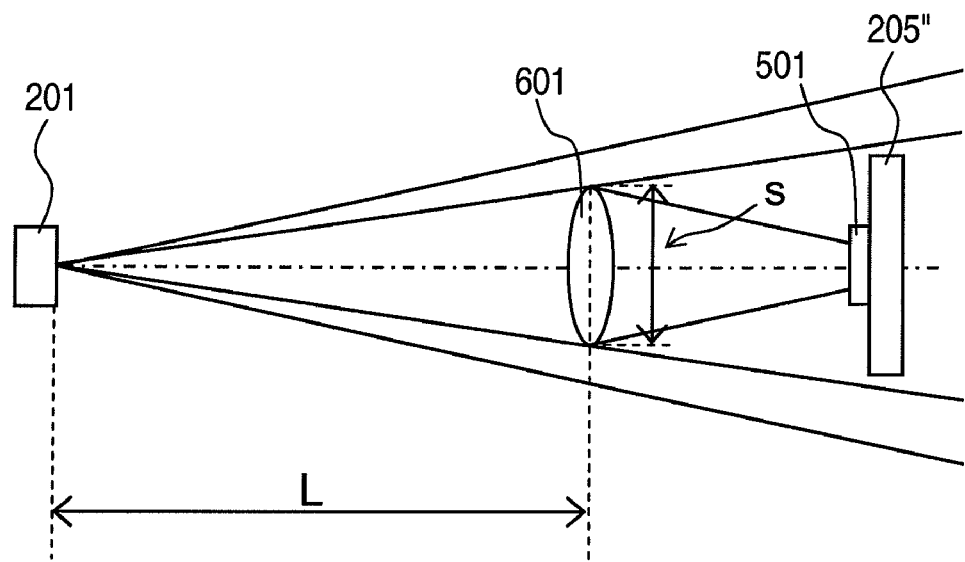
FIG. 9 is a detail view of the optical pickup illustrated in FIG. 8 showing a positional relationship between a front monitor and a light beam.

Referring now to FIGS. 8 and 9, an optical pickup in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (").

As shown in FIGS. 8 and 9, an optical pickup 103" includes a front monitor 205". The front monitor 205" further includes a light receiver 501 and a sensor lens 601. The sensor lens 601 is fixedly attached to or separately disposed from the light receiver 501. The sensor lens 601 converges a light beam (e.g., transmitted light) on the light receiver 501. Specifically, the sensor lens 601 is provided to a front face of the light receiver 501 of the front monitor 205". As a result, it is possible to converge the radiated light beam and receive the light beam at the light receiver 501. More specifically, the entire light beam emitted from the sensor lens 601 is incident on the light receiver 501 to form an emission area on the light receiver 501 that is smaller than an area of the light receiver 501. The front monitor 205" is disposed near an optical axis of the transmitted light so that a ratio of the luminous energy detected by the front monitor 205" to the luminous energy emitted by an objective lens 207 maintains a substantially constant value. Furthermore, the front monitor 205" is disposed so that the following is satisfied: $1 \leq (S \times L)/(s \times f) \leq 6.8$. Here, S is an area of an entrance pupil of the objective lens 207, f is an optical distance of an optical path from an emission point of a semiconductor laser 201 to a collimating lens 206, s is an effective receiving area of the front monitor 205", and L is an optical distance from the emission point of the semiconductor laser 201 to the front monitor 205". Specifically, the effective receiving area of the front monitor 205" corresponds to an area of an entrance pupil of the sensor lens 601. The optical distance from the emission portion of the semiconductor laser 201 to the front monitor 205" corresponds to a distance from the emission portion of the semiconductor laser 201 to the sensor lens 601 of the front monitor 205". More specifically, L is an optical distance from the emission point of the semiconductor laser 201 to a main plane 602 of the sensor lens 601. In the first embodiment, the greater is the optical distance L from the emission point of the semiconductor laser 201 to the light receiver 501 of the front monitor 205, the more the light beam spread out in a radiating pattern, the smaller is the light beam received at the light receiver 501, and the lower is the light receiving sensitivity. With the optical pickup in accordance with the second embodiment, the sensor lens 601 is used to converge the radiated light beam, which raises the sensitivity of the front monitor 205" and also allows the optical distance L from the emission point of the semiconductor laser 201 to the light receiver 501 to be increased in proportion to how much convergence is possible. That is, since the effective receiving area of the front monitor 205" can be increased, an upper limit of $(S \times L) \div (f \times s)$ can be lowered, which makes it possible to increase the optical distance L from the emission point of the semiconductor laser 201 to the light receiver 501 of the front monitor 205". Thus, it is possible to impart more design latitude in a layout of the front monitor 205".

With the optical pickup, the sensor lens 601 is provided to a front face of the light receiver 501 of the front monitor 205", which makes it possible to converge the radiated light beam and receive the light beam at the front monitor 205". Specifically, since the entrance pupil s (e.g., opening area) of the sensor lens 601 can be increased, L can be set longer. The greater is the optical distance L from the emission point of the semiconductor laser 201 to the light receiver 501 of the front monitor 205", the more spread out is the diffusion angle of the light beam, the lower is the optical density of the light beam received by the front monitor 205", and the lower is the light reception sensitivity. However, with the optical pickup 103", the sensor lens 601 is used to converge the radiated light beam. Thus, the sensitivity of the front monitor 205" is increased, and to the extent that convergence is possible, the optical distance L from the emission point of the semiconductor laser 201 to the sensor lens 601 of the front monitor 205" can be increased, which affords greater design latitude in the layout of the front monitor 205".

Third Embodiment

Figure 10:
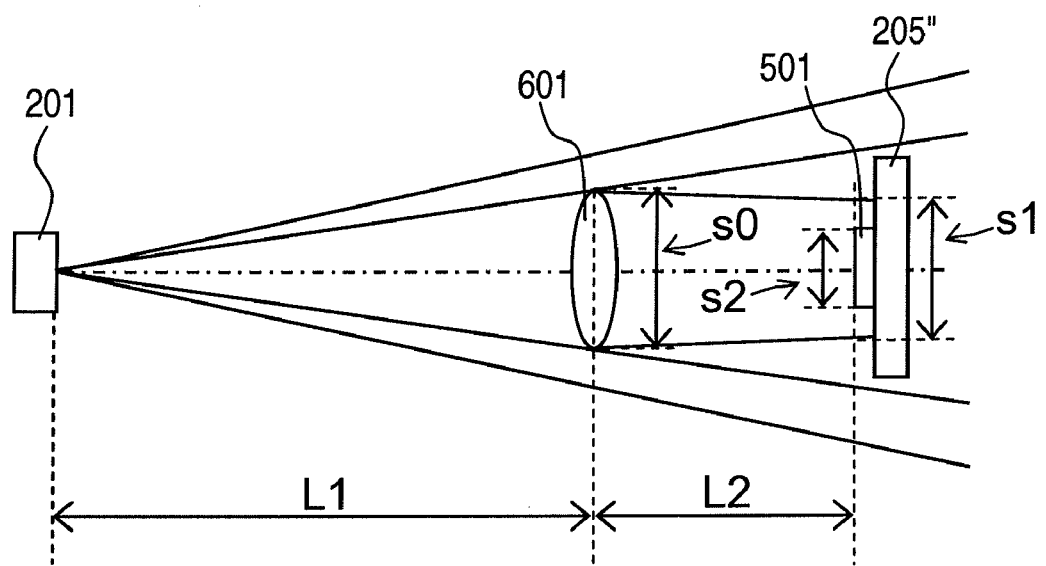
FIG. 10 is a detail view of an optical pickup in accordance with a third embodiment of the present invention.

Referring now to FIG. 10, an optical pickup in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity.

In the second embodiment, the entire light beam emitted from the sensor lens 601 is incident on the light receiver 501. However, the light beam emitted from the sensor lens 601 can be incident on the light receiver 501 to form an emission area on the front monitor 205" that is larger than the area of the light receiver 501. In other words, the emission area of the light beam can includes the light receiver 501. In this case, the front monitor 205" can be disposed near an optical axis of the transmitted light so that a ratio of the luminous energy detected by the front monitor 205" to the luminous energy emitted by an objective lens 207 maintains a substantially constant value. Furthermore, the front monitor 205" can be disposed so that the following is satisfied: $1 \leq (S \times L)/(s \times f) \leq 6.8$. Here, S is an area of an entrance pupil of the objective lens 207, f is an optical distance of an optical path from an emission point of a semiconductor laser 201 to a collimating lens 206, s is an effective receiving area of the front monitor 205", and L is an optical distance from the emission point of the semiconductor laser 201 to the front monitor 205". Specifically, the effective receiving area s of the front monitor 205" corresponds to an area that is calculated by the following: $s = s0 \times s2/s1$. Here, s0 is an area of an entrance pupil of the sensor lens 601, s1 is an emission area of the light beam at a location of the light receiver 501, and s2 is an area of the light receiver 501. Furthermore, the optical distance L from the emission portion of the semiconductor laser 201 to the front monitor 205" corresponds to a distance that is calculated by the following: $L = L1 + L2 \times (1 - s1/s2)$. Here, L1 is a distance from the emission portion of the semiconductor laser 201 to the main plane 602 of the sensor lens 601, and L2 is a distance from the main plane 602 of the sensor lens 601 to the light receiver 501.

The optical pickup in accordance with the first to third embodiment is favorable for an optical disk device capable of recording to a high-capacity optical disk such as a CD-R or a DVD-R.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of an optical disk device equipped with the present invention. Accordingly, these terms, as utilized to describe the present invention should be interpreted relative to an optical disk device equipped with the present invention as used in the normal operating position. Finally, terms of degree such as "substantially", "about" and "approximately" as used herein mean a reasonable amount of deviation of the modified term such that the end result is not significantly changed.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. An optical pickup comprising:
   a semiconductor laser configured to emit a light beam;
   a beam splitter arranged relative to the semiconductor laser to split the light beam emitted by the semiconductor laser into transmitted light and reflected light;
   a collimating lens arranged to parallelize the reflected light from the beam splitter;
   an objective lens arranged to converge the reflected light being parallelized by the collimating lens on an optical disk;
   an aperture arranged to limit the reflected light incident on the objective lens; and
   a front monitor arranged to receive the transmitted light and detect luminous energy of the transmitted light to detect luminous energy of the reflected light emitted from the objective lens, with the front monitor being disposed near an optical axis of the transmitted light so that the following is satisfied:

$$1 \leq (S \times L)/(s \times f) \leq 6.8$$

where S is a total area of an entrance pupil of the objective lens, f is an optical distance from an emission portion of the semiconductor laser to the collimating lens, s is a total effective receiving area of the front monitor, and L is an optical distance from the emission portion of the semiconductor laser to the front monitor,
   the front monitor including a receiver that is arranged to receive the transmitted light,
   the total effective receiving area of the front monitor corresponding to a total area of the receiver, and
   the optical distance from the emission portion of the semiconductor laser to the front monitor corresponding to a distance from the emission portion of the semiconductor laser to the receiver.

2. The optical pickup according to claim 1, wherein the total area of the entrance pupil of the objective lens is substantially equal to a total opening area of the aperture.

3. The optical pickup according to claim 1, wherein the beam splitter further includes a half mirror.

4. The optical pickup according to claim 1, wherein the front monitor is disposed near the optical axis of the transmitted light so that a ratio of the luminous energy detected by the front monitor to the luminous energy emitted by the objective lens maintains a substantially constant value.

5. An optical pickup comprising:
   a semiconductor laser configured to emit a light beam;
   a beam splitter arranged relative to the semiconductor laser to split the light beam emitted by the semiconductor laser into transmitted light and reflected light;
   a collimating lens arranged to parallelize the reflected light from the beam splitter;
   an objective lens arranged to converge the reflected light being parallelized by the collimating lens on an optical disk;
   an aperture arranged to limit the reflected light incident on the objective lens; and
   a front monitor arranged to receive the transmitted light and detect luminous energy of the transmitted light to detect luminous energy of the reflected light emitted from the objective lens, with the front monitor being disposed near an optical axis of the transmitted light so that the following is satisfied:

$$1 \leq (S \times L)/(s \times f) \leq 6.8$$

where S is a total area of an entrance pupil of the objective lens, f is an optical distance from an emission portion of the semiconductor laser to the collimating lens, s is a total effective receiving area of the front monitor, and L is an optical distance from the emission portion of the semiconductor laser to the front monitor,
   the front monitor including a receiver and a sensor lens that is arranged to converge the transmitted light on the receiver,
   the total effective receiving area of the front monitor corresponding to a total area of an entrance pupil of the sensor lens, and
   the optical distance from the emission portion of the semiconductor laser to the front monitor corresponding to a distance from the emission portion of the semiconductor laser to the sensor lens of the front monitor.

6. The optical pickup according to claim 5, wherein the sensor lens is fixedly attached to a front face of the receiver.

7. The optical pickup according to claim 5, wherein the sensor lens is separately disposed from the receiver.

8. The optical pickup according to claim 5, wherein the total area of the entrance pupil of the objective lens is substantially equal to a total opening area of the aperture.

9. The optical pickup according to claim 5, wherein the beam splitter further includes a half mirror.

10. The optical pickup according to claim 5, wherein the front monitor is disposed near the optical axis of the transmitted light so that a ratio of the luminous energy detected by the front monitor to the luminous energy emitted by the objective lens maintains a substantially constant value.

11. An optical pickup comprising:
    a semiconductor laser configured to emit a light beam;
    a beam splitter arranged relative to the semiconductor laser to split the light beam emitted by the semiconductor laser into transmitted light and reflected light;
    a collimating lens arranged to parallelize the reflected light from the beam splitter;
    an objective lens arranged to converge the reflected light being parallelized by the collimating lens on an optical disk;

an aperture arranged to limit the reflected light incident on the objective lens; and a front monitor arranged to receive the transmitted light and detect luminous energy of the transmitted light to detect luminous energy of the reflected light emitted from the objective lens, with the front monitor being disposed near an optical axis of the transmitted light so that the following is satisfied:

$$1 \leq (S \times L)/(s \times f) \leq 6.8$$

where S is a total area of an entrance pupil of the objective lens, f is an optical distance from an emission portion of the semiconductor laser to the collimating lens, s is a total effective receiving area of the front monitor, and L is an optical distance from the emission portion of the semiconductor laser to the front monitor, the front monitor including a receiver and a sensor lens that is arranged to converge the transmitted light on the receiver, the total effective receiving area of the front monitor corresponding to a total area that is calculated by the following:

$$s = s0 \times s2/s1$$

where s0 is a total area of an entrance pupil of the sensor lens, s1 is a total emission area of the transmitted light at a location of the receiver, and s2 is a total area of the receiver, and the optical distance from the emission portion of the semiconductor laser to the front monitor corresponding to a distance that is calculated by the following:

$$L = L1 + L2 \times (1 - s1/s2)$$

where L1 is a distance from the emission portion of the semiconductor laser to the sensor lens, and L2 is a distance from the sensor lens to the receiver.

12. The optical pickup according to claim 11, wherein the sensor lens is fixedly attached to a front face of the receiver.

13. The optical pickup according to claim 11, wherein the sensor lens is separately disposed from the receiver.

14. The optical pickup according to claim 11, wherein the total area of the entrance pupil of the objective lens is substantially equal to a total opening area of the aperture.

15. The optical pickup according to claim 11, wherein the beam splitter further includes a half mirror.

16. The optical pickup according to claim 11, wherein the front monitor is disposed near the optical axis of the transmitted light so that a ratio of the luminous energy detected by the front monitor to the luminous energy emitted by the objective lens maintains a substantially constant value.

* * * * *